United States Patent Office 3,808,101
Patented Apr. 30, 1974

3,808,101
BIOLOGICAL METHOD OF PRODUCING TRYPTOPHAN AND 5-SUBSTITUTED TRYPTOPHANS
Hitoshi Enei, Zushi, Hidetsugu Nakazawa, Kawasaki, Hiroshi Matsui, Yokohama, Shinji Okumura, Tokyo, and Hideaki Yamada, Kyoto, Japan, assignors to Ajinomoto Co., Inc., Tokyo, Japan
No Drawing. Filed Dec. 20, 1971, Ser. No. 210,046
Claims priority, application Japan, Dec. 22, 1970, 45/116,017
Int. Cl. C12b 1/00
U.S. Cl. 195—29   9 Claims

ABSTRACT OF THE DISCLOSURE

L - tryptophan, 5-hydroxy-L-tryptophan, 5-methyl-L-tryptophan and 5-amino-L-trytophan are produced by the action of tryptophanase produced by cultivation of certain microorganisms, on indole, 5-hydroxyindole, 5-methylindole and 5-aminoindole, and ammonia, and pyruvic acid, oxalacetic acid, fumaric acid, malic acid, maleic oxime, glyoxylic acid or lactic acid.

---

This invention relates to a process for producing amino acids by enzyme action.

An object of the invention is to produce L-tryptophan, 5-hydroxy-L-tryptophan, 5 - methyl-L-tryptophan and 5-amino-L-tryptophan easily at low cost.

L-tryptophan is one of the essential amino acids, and 5-hydroxy-L-tryptophan is useful as medicine.

It is known that certain microorganisms produce L-tryptophan when cultured in a medium containing a precursor of tryptophan, such as indole or anthranilic acid. However, the concentrations of L-tryptophan produced in the culture medium are very low in the prior art processes. It has never been known that 5-hydroxy-L-tryptophan is biologically produced.

We have now found that a heterocyclic compound having the following general formula:

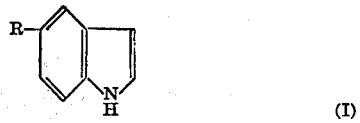

wherein R is hydrogen, hydroxyl, methyl or amino, reacts with (a) ammonium ions and (b) an acid selected from the group consisting of pyruvic acid, oxalacetic acid, malic acid, maleic oxime, fumaric acid, glyoxylic acid and lactic acid, in aqueous solution in the presence of an effective amount of tryptophanase or a source of tryptophanase, and an amino acid having the formula:

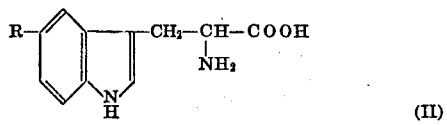

wherein R is is as defined above, is produced in very high yield.

The enzyme tryptophanase is known to catalyze the decomposition of L-tryptophan to indole, ammonia and pyruvic acid. A pure enzyme preparation can be used in the present invention, and sources of tryptophanase are preferably used. The tryptophanase source may be a broth in which a mircoorganism capable of producting the enzyme is cultivated, or a cell-free filtrate thereof, an aqueous suspension of the cells or of ground cells, or a filtrate of the suspension.

Microorganisms capable of producing the enzyme are distributed widely and belong to the genera Escherichia, Aerobacter, Erwinia, Pseudomonas, Xanthomonas, Proteus, Citrobacter, Paracolobactrum, Salmonella and Kluyversa. Typical examples of suitable species are Escherichia coli, Aerobacter aerogenes, Erwinia herbicola, Pseudomonas perlurida, Xanthomonas campestris, Proteus mirabilis, Citrobacter freundii, Paracolobactrum coliforme, Salmonella gallinarum and Kluyvera citrophilla.

The media employed for culturing the microorganisms may be conventional, containing sources of assimilable carbon and nitrogen and the usual minor nutrients and also include a proper amount of tryptophan, 5-hydroxy trytophan, 5-methyl tryptophan or 5-amino tryptophan. The microorganisms have been grown successfully on media containing, as carbon sources, carbohydrates such as glucose, fructose, sucrose, mannose, maltose, mannitol, xylose, galactose, starch hydrolyzate and molasses. Organic acids such as acetic acid, citric acid, lactic acid, fumaric acid, malic acid, $\alpha$-ketoglutaric acid, gluconic acid and pyruvic acid, alcohols such as methanol, ethanol, propanol and butanol, fatty acids and hydrocarbons are also useful as main carbon sources or supplemental carbon sources for selected microorganisms. The concentration of the carbon source in the medium is normally between 0.1 and 10 g./dl. based on glucose equivalents. Nitrogen may be provided by ammonium salts of inorganic or organic acids, such as hydrochloric, sulfuric, phosphoric, nitric, acetic and carbonic acid, by urea, and by ammonia in an aqueous solution or in the gaseous state. Other organic substances containing nitrogen such as corn steep liquor, yeast extract, peptone, meat extract and NZ-amine are employed as supplemental nitrogen sources.

The medium should also contain inorganic salts and minor organic nutrients which promote the growth of the microorganisms. The inorganic salts may include dipotassium hydrogen phosphate, potassium dihydrogen phosphate, magnesium sulfate, sodium chloride, ferrous sulfate, manganese sulfate, zinc sulfate, copper sulfate and calcium carbonate. Known organic growth promoting substances include amino acids generally, biotin, vitamins, organic acids, fatty acids and protein. They may be supplied by substances which yield the active agent under the conditions of culturing, such as meat extract, peptone, yeast extract, corn steep liquor, skim milk, chlorella extract, and soybean protein hydrolyzate.

Trytophan, 5-hydroxy trypthophan, 5-methyl tryptophan or 5-amino tryptophan should be added to the medium in an amount of more than 0.01 g./dl. and preferably from 0.05 to 0.5 g./dl. The trytophan may be in the form of organic nutrients, such as amino acid mixture, polypeptone or soybean extract.

When the microorganism capable of producing tryptophanase is cultured on the above media in the presence of a surface active agent, the enzyme activity of the tryptophanase obtained is very high.

Useful surface active agents are nonionic, anionic, cationic and amphoteric surface active agents, and nonionic surfactants are preferable. Examples of useful surface active agents include:

Cationic surface active agents: Cetyltrimethylammonium halide
Anionic surface active agents:
　　Laurylalcohol sulfonate
　　Alkylarylsulfonate
Amphoteric surface active agents: Imidazoline
Nonionic surface active agents:
　　Polyoxyethylene alkylphenol ether
　　Polyoxyethylenealkyl ether
　　Polyoxyethylenesorbitan monoalkylester
　　Sorbitanalkylmonoester
　　Polyoxyethylenealkylarylether
　　Fatty alkylolamide
　　Polyoxyethylenetrioleate The surface active agents may be generally present in the culture medium in an amount of 0.1 to 10 g./dl.

The cultivation is carried out under aerobic conditions, at 25 to 40° C. It is preferred to adjust the pH of the culture medium to 5.5 to 8.5 during cultivation. Culturing is generally carried out for from 10 to 72 hours.

The broth may be used as an enzyme source as it is, without removing the bacterial cells. A cell-free filtrate of the culture broth, a cell suspension and a suspension of crushed bacterial cells prepared by trituration, autolysis or ultrasonic oscillation can also be used as the enzyme source in the process of the present invention. Crude enzyme and pure enzyme recovered by centrifugation, salting out and solvent precipitation can also be used.

The amino acids of Formula II may be prepared by adding the compound of Formula I, ammonium ions and the selected acid, salt or derivative to the aqueous medium during cultivation.

The compounds of Formula I respectively are indole, 5 - hydroxyindole, 5 - methylindole and 5 - aminoindole, and they may be added in an amount of 0.1 to 20 g./dl.

The acids used as the source of the alanine moiety of the amino acid of Formula II are pyruvic acid, oxaloacetic acid, malic acid, fumaric acid, maleic oxime, glyoxylic acid or lactic acid, although salts or other sources of the acids can be employed. The pyruvic acid, oxaloacetic acid, malic acid, fumaric acid, maleic oxime, glyoxylic acid and lactic acid may be in the form of a free acid, of salts such as the ammonium, sodium, potassium or calcium salt, or of esters such as the methyl or ethyl ester; and other derivatives may also be used. The ammonium salt of the acid is preferred. The acid is preferably present in the reaction system in an amount of 0.1 to 20% (weight 1 volume) as the free acid. The ammonium ions may be added in an amount of 0.1 to 20 g./dl.

The reaction is preferably carried out at pH 5 to 10 and at 10 to 50° C. The pH of the reaction system can be maintained by the addition of calcium carbonate, ammonia, caustic alkali or phosphate buffer solution.

The yield can be greatly increased by adding vitamin $B_6$, such as pyridoxal phosphate, pyridoxal or pyridoxine and/or a reducing agent to the reaction system. Examples of suitable reducing agents are sulfurous acids, sodium sulfite, potassium sulfite, ammonium sulfite, thiosulfuric acid, potassium thiosulfate, sodium thiosulfate, ammonium thiosulfate, cysteine, $\beta$-mercaptoethanol and ascorbic acid. The vitamin $B_6$ and the reducing agents are generally used in an amount of from 0.01 to 1 g./dl.

The yield of the end product can be greatly increased by adding inosine to the reaction system. L-tryptophan and inosine may react in the reaction system to form a precipitate of a tryptophan-inosine complex.

The complex is easily converted into tryptophan and inosine when treated in an aqueous solution having a pH of less than 4 or more than 10.

The amino acids produced in the reaction mixture may be recovered by conventional methods.

EXAMPLE 1

A culture medium containing 2 g./l. L-tryptophan, 5 g./l. $KH_2PO_4$, 0.5 g./l. $MgSO_4 \cdot 7H_2O$, 2 p.p.m. and Mn ions, 2 g./l. glycerol, 2 g./l. yeast extract and 5 g./l. casamino acid, of pH 7.0 was prepared, each 60 ml. batch of the medium was inoculated with a loop of bacterial as indicated in Table 1, and cultured at 31° C., for 20 hours with shaking.

One liter of the cultured broth was centrifuged to collect the bacterial cells, the cells were added to 1 liter batches of respective solutions containing (A) 20 g. indole, 24 g. sodium pyruvate and 40 g. ammonium acetate, of pH 8.0, (B) 20 g. indole, 24 g. oxacetic acid and 40 g. ammonium acetate, of pH 8.0 (C) 20 g. 5-hydroxyindole, 24 g. sodium acetate and 40 g. ammonium acetate, of pH 8.0 and (D) 20 g. 5-hydroxyindole, 24 g. oxalacetic acid and 40 g. ammonium acetate, of pH 8.0. Each reaction solution was stirred at 37° C. for 20 hours. The amounts of L-tryptophan and 5-hydroxy-L-tryptophan found in the reaction mixtures are listed in Table 1.

| | Amount of the end product (g./l.) | | | |
|---|---|---|---|---|
| | Tryptophan | | 5-OH-tryptophan | |
| Bacteria used | Solution A | Solution B | Solution C | Solution D |
| Proteus mirabilis ATCC 15290 | 8.0 | 6.2 | 4.8 | 4.2 |
| Escherichia coli ATCC 3655 | 4.6 | 3.8 | 3.0 | 2.3 |
| Escherichia coli ATCC 10798 | 5.2 | 4.1 | 3.2 | 2.5 |
| Erwinia herbicola ATCC 21433 | 2.2 | 1.8 | 1.7 | 1.5 |
| Erwinia herbicola ATCC 21434 | 2.4 | 1.9 | 1.7 | 1.6 |
| Pseudomonas perlurida ATCC 490 | 3.4 | 2.7 | 2.3 | 2.1 |
| Aerobacter aerogenes ATCC 8724 | 4.4 | 3.6 | 3.0 | 2.5 |
| Aerobacter aerogenes ATCC 7256 | 4.0 | 3.3 | 2.7 | 2.4 |
| Aerobacter liquefaciens ATCC 14460 | 6.0 | 5.1 | 3.0 | 2.4 |
| Salmonella gallinarum ATCC 9148 | 2.1 | 1.8 | 1.5 | 1.2 |
| Citrobacter freundii ATCC 8090 | 2.3 | 1.9 | 1.0 | 0.7 |
| Citrobacter freundii ATCC 6750 | 2.4 | 1.9 | 1.1 | 0.7 |
| Kluyvera citrophila ATCC 14236 | 3.4 | 2.5 | 1.3 | 0.9 |
| Xanthomonas campestris ATCC 7381 | 1.8 | 1.5 | 1.3 | 0.5 |
| Clostridium felsineum ATCC 13160 | 1.6 | 1.4 | 1.1 | 0.8 |

Aqueous sodium hydroxide solution was added to one liter reaction mixture from Escherichia coli ATCC 3655 to dissolve precipitated tryptophan, and the resulting solution was filtered in the presence of diatomaceous earth. The pH of the filtrate was adjusted to 4.0 with hydrochloric acid, the solution was introduced into a column packed with active charcoal, and L-tryptophan adsorbed on the active charcoal was eluted with 2 N-ammonia water. The eluate was concentrated to dryness, the crystals obtained were washed with acetone, and 5.2 g. pure crystalline L-tryptophan was obtained.

EXAMPLE 2

Bacterial cells obtained from 100 ml. culture broths of the bacteria listed in the following Table 2 were added to 100 ml. solutions containing 1.0 g./dl. lactic acid, malic acid, glyoxylic acid, maleic oxime or fumaric acid, 2.0 g./dl. ammonium acetate and 1.5 g./dl. indole, the pH of the mixture was adjusted to 8.0, and each mixture was stirred at 37° C. for 44 hours. The amounts of L-tryptophan produced in the reaction mixtures are listed in Table 2.

TABLE 2

| | Amount of tryptophan (g./l.) produced from— | | | | |
|---|---|---|---|---|---|
| | Malic acid | Fumaric acid | Glyoxylic acid | Lactic acid | Maleic oxime |
| Erwinia herbicola ATCC 21433 | 0.5 | 0.3 | 0.2 | 2.0 | 0.4 |
| Citrobacter freundii ATCC 6750 | 1.0 | 0.7 | 1.0 | 1.5 | 1.4 |
| Proteus mirabilis ATCC 15290 | 3.0 | 0.7 | 1.0 | 3.8 | 1.3 |
| Pseudomonas perlurida ATCC 490 | 0.5 | 0.8 | 0.7 | 2.0 | 0.6 |
| Salmonella gallinarum ATCC 9148 | 1.3 | 1.0 | 0.7 | 1.7 | 1.5 |
| Escherichia coli ATCC 3655 | 1.0 | 0.5 | 1.0 | 3.5 | 1.0 |
| Paracolobactrum coliforme ATCC 11605 | 1.0 | 0.5 | 0.9 | 1.1 | 0.8 |
| Xanthomonas campestris ATCC 7381 | 0.4 | 0.3 | 0.6 | 0.6 | 0.3 |
| Kluyvera citrophila ATCC 14236 | 0.4 | 0.6 | 0.4 | 1.5 | 1.1 |
| Aerobacter aerogenes ATCC 7256 | 0.5 | 0.8 | 0.8 | 1.5 | 1.2 |

EXAMPLE 3

A basal medium containing

| | | |
|---|---|---|
| Corn steep liquor | ml./dl. | 2.0 |
| $KH_2PO_4$ | g./dl. | 0.05 |
| $MgSO_4 \cdot 7H_2O$ | g./dl. | 0.05 |
| Fe and Mn ions | p.p.m. | 2 |
| Glycerol | g./dl. | 0.2 |
| Yeast extract pH: 7.5 (with KOH) | g./dl. | 2.0 | was prepared, and mixed with 0.2 g./dl. L-tryptophan (medium A), 0.2 g./dl. 5-hydroxy-L-tryptophan (medium B) and 0.2 g./dl. 5-methyl-L-tryptophan (medium C) respectively. 60 ml. batches of each medium were inoculated with a spoonful *Proteus mirabilis* ATCC 15290 which had previously been cultured on a bouillon agar slant at 30° C. for 20 hours. The media A, B and C were cultured at 31° C. for 20 hours with shaking.

2.0 g./dl. sodium pyruvate, 4.0 g./dl. sodium acetate and 2.0 g./dl. indole were added to each cultured broth A, B and C, the pH of the broths was adjusted to 8.0 with ammonia water, and the mixtures were stirred at 37° C. for 40 hours.

The amounts of L-tryptophan produced in the reaction mixtures are listed in Table 3.

TABLE 3

| Reaction mixture of: | Amount of L-tryptophan produced (g./l.) |
|---|---|
| Medium A | 8.5 |
| Medium B | 4.5 |
| Medium C | 3.8 |

EXAMPLE 4

A culture medium containing 0.2 g./dl. L-tryptophan, 0.1 g./dl. $KH_2PO_4$, 0.05 g./dl. $MgSO_4 \cdot 7H_2O$, 2 p.p.m. of Mn and Fe ions, 2 ml./dl. corn steep liquor, 1 g./dl. yeast extract and 0.5 g./dl. casamino acid was prepared, and the pH of the medium was adjusted to 7.5 with KOH solution. *Proteus morganii* IFO 3848 was inoculated on the medium and cultured at 31° C. for 20 hours. 100 ml. batches of the cultured broth were centrifuged to collect bacterial cells, the cells were added to 100 ml. of the following solutions (A), (B), (C) and (D), and the solutions were kept at 37° C. for 44 hours.

| Solution (A): | G./dl. |
|---|---|
| Indole | 1.5 |
| Pyruvic acid: pH: 8.0 (with $NH_4OH$) | 1.5 |
| Solution (B) | |
| Indole | 1.5 |
| Sodium pyruvate | 1.5 |
| Ammonium acetate: pH: 8.0 (with $NH_4OH$) | 3.0 |
| Solution (C): | |
| Indole | 1.5 |
| Calcium pyruvate | 1.5 |
| Ammonium acetate: pH: 8.0 (with $NH_4OH$) | 3.0 |
| Solution (D): | |
| Indole | 1.5 |
| Sodium pyruvate | 1.5 |
| Ammonium chloride: pH: 8.0 (with $NH_4OH$) | 3.0 |

The amounts of L-tryptophan produced in the solutions were as follows:

| Reaction system: | Amount of tryptophan produced (g./l.) |
|---|---|
| Solution (A) | 4.5 |
| Solution (B) | 9.6 |
| Solution (C) | 8.0 |
| Solution (D) | 7.5 |

EXAMPLE 5

Bacterial cells of *Proteus morganii* IFO 3848 which had been obtained from 30 liter culture broth prepared as in Example 4 were treated with ultrasonic waves of 20 kilocycles per second for 15 minutes in 0.05 M-phosphate buffer of pH 6.0. The treated cell suspension was centrifuged, supernatant was mixed with ammonium sulfate to precipitate enzyme protein, and the enzyme was purified by treating with protamin, with DEAE-sephadex and with "Sephadex G-150."

40 milligrams as protein of the enzyme obtained were added to a 100 ml. solution containing

| | G./dl. |
|---|---|
| Indole | 2.0 |
| Sodium pyruvate | 2.0 |
| Ammonium acetate | 4.0 |
| $Na_2SO_3$ | 0.2 |
| EDTA | 0.1 |
| Pyridoxal phosphate: pH: 8.0 (with $NH_4OH$) | 0.01 | and the mixture was kept at 37° C. for 20 hours.

The reaction mixture was found to contain 6.4 g./l. L-tryptophan.

EXAMPLE 6

*Proteus morganii* IFO 3848 was cultured in the same way as in Example 4, each 100 ml. batch of the culture broth was mixed with 2.0 g. indole, 2.0 g. sodium pyruvate and 2.0 g. ammonium acetate, and the pH of the mixtures was adjusted to 8.0 with ammonia water. The mixtures were kept at 37° C. for 44 hours after addition of 10 mg. pyridoxal phosphate, 10 mg. pyridoxal or 10 mg. pyridoxine. The amounts of L-tryptophan produced were as follows:

| Vitamin B6: | Amount of tryptophan produced (g./l.) |
|---|---|
| None | 5.5 |
| Pyridoxal phosphate | 10.5 |
| Pyridoxal | 7.0 |
| Pyridoxine | 8.5 |

EXAMPLE 7

Bacterial cells obtained from 10 ml. culture broth of the bacteria indicated in Table 4 which had been cultured as in Example 1 were added to 10 ml. of the following solutions (I) and (II), and were reacted at 37° C. for 20 hours.

| Solution (I): | G./dl. |
|---|---|
| 5-methylindols | 2.0 |
| Sodium pyruvate | 2.0 |
| Ammonium acetate: pH: 8.0 (with $NH_4OH$) | 2.0 |
| Solution (II): | |
| 5-aminoindole | 2.0 |
| Sodium pyruvate | 2.0 |
| Ammonium acetate: pH: 8.0 (with $NH_4OH$) | 2.0 |

The amounts of 5-methyl-L-tryptophan produced in solutions (I) and 5-amino-L-tryptophan produced in solution (II) are listed in Table 4.

TABLE 4

| Bacteria used | Amount (g./l.) of— | |
|---|---|---|
| | 5-methyl-try. | 5-amino-try. |
| *Erwinia herbicola* ATCC 21433 | 1.2 | 1.5 |
| *Escherichia coli* ATCC 7009 | 2.5 | 2.8 |
| *Proteus mirabilis* ATCC 15290 | 3.0 | 3.5 |
| *Aerobacter aerogenes* ATCC 8724 | 1.5 | 1.8 |
| *Kluyvera citrophila* ATCC 14236 | 2.0 | 2.5 |

EXAMPLE 8

Culture media (A), (B) and (C) having the following composition

| | Medium | | |
|---|---|---|---|
| | (A) | (B) | (C) |
| L-tryptophan (g./dl.) | 0.2 | 0.2 | 0.2 |
| $KH_2PO_4$ (g./dl.) | 0.5 | 0.5 | 0.5 |
| $MgSO_4 \cdot 7H_2O$ (g./dl.) | 0.05 | 0.05 | 0.05 |
| Corn steep liquor (ml./dl.) | 6.0 | 6.0 | 6.0 |
| Soybean protein hydrolyzate (g./dl.) | 2.0 | 2.0 | 2.0 |
| Indole (g./dl.) | 0 | 0.05 | 0.05 |
| Sorpol W-200 [1] | 0 | 0 | 1.0 |
| pH | 7.5 | 7.5 | 7.5 |

[1] Sorpol W-200: Brand name of nonionic detergent.

were prepared, 60 ml. batches of the cuture media were inoculated with *Proteus mirabilis* ATCC 15290 which had been cultured on a bouillon agar slant, and cultured at 31° C. for 20 hours with shaking.

Bacterial cells obtained from 10 ml. culture broths (A), (B) and (C) were added to 10 ml. of a solution containing 3 g./l. indole, 3 g./l. sodium pyruvate and 3 g./dl. ammonium acetate, of pH 8.0, and were reacted at 37° C. for 20 hours.

The amounts of L-tryptophan produced were as follows:

Bacteria cultured in:    Amounts of tryptophan produced (gl./l.)
Medium (A) _____ 20.0
Medium (B) _____ 0.8
Medium (C) _____ 23.8

EXAMPLE 9

*Aerobacter aerogenes* ATCC 8724 was cultured in media containing 0.2 or 0.6 g./dl. L-tryptophan as indicated in Table 5, 0.5 g./dl. $KH_2PO_4$, 0.5 g./dl. $MgSO_4 \cdot 7H_2O$, 6.0 ml./dl. corn steep liquor and 2.0 g./dl. soybean protein hydrolyzate, of pH 7.5 in the presence of "Sorpol W-200" as indicated in Table 5, bacterial cells obtained from 10 ml. culture broth were added to solutions containing 3 g./dl. indole, 3 g./dl. sodium pyruvate and 3 g./dl. ammonium acetate, of pH 8.0, and the mixtures were kept at 37° C. for 20 hours.

L-tryptophan produced in the reaction mixtures is listed in Table 5.

TABLE 5

| | Amount of try. produced (g./l.) | |
|---|---|---|
| Amount of try. added to culture medium | 0.2 g./dl. | 0.6 g./dl. |
| Amount of detergent added to culture medium (g./dl.): | | |
| 0 | 16 | 11 |
| 1 | 25 | 24 |
| 3 | 28 | 44 |
| 5 | 28 | 46 |

As can be seen from the results of Examples 8 and 9, the inhibition of enzyme production by indole is largely prevented by adding a surface active agent to the culture medium.

EXAMPLE 10

*Proteus mirabilis* ATCC 15290 and *Aerobacter aerogenes* ATCC 8724 were cultured in media containing 0.6 g./dl. L-tryptophan, 0.5 g./dl. $KH_2PO_4$, 0.05 g./dl. $MgSO_4 \cdot 7H_2O$, 6 ml./dl. corn steep liquor and 2 g./dl. soybean protein hydrolyzate, of pH 7.5, in the presence of 5 g./dl. surface active agents as indicated in Table 6 at 31° C., for 20 hours, and reactions were performed by bacterial cells obtained from 10 ml. culture broth as in Example 8.

The amount of L-tryptophan produced in the reaction mixtures are listed in Table 6.

TABLE 6

| | Amount of L-try. produced (g./l.) by— | |
|---|---|---|
| Detergent used | Proteus mirabilis | Aerobacter aerogenes |
| Nonionic: | | |
| Liponox MCK N-1 | 37 | 30 |
| Nissan Nonion NS-230, N-3 | 44 | 42 |
| Nissan Nonion NS-230, N-4 | 31 | 25 |
| Nissan Nonion ST-221, N-11 | 46 | 42 |
| Nissan Nonion ST-221, N-12 | 29 | 20 |
| Triton XN-100 N-32 | 34 | 30 |
| Sorpol W-150 | 40 | 25 |
| Nonal N-37 | 33 | 28 |
| Nonal 310 N-38 | 27 | 21 |
| Pegnol 14-O N-39 | 30 | 24 |
| Pegnol 1500 N-42 | 40 | 32 |
| Sorbon T-20 N-46 | 21 | 18 |
| Tohol N-270 N-50 | 18 | 9 |
| Nonal 104 N-51 | 37 | 28 |
| Nonal 208 N-52 | 39 | 28 |
| Nonal 813 N-53 | 13 | 8 |
| Pegnol 16L N-59 | 32 | 25 |
| Triton N-100 | 37 | 28 |
| Tween 80 | 33 | 28 |
| Cationic: | | |
| Katinol HTB | 11 | 11 |
| Anstex C-160 | 13 | 14 |
| Anionic: | | |
| Liponal F-103 | 11 | 12 |
| Punox P-80 | 13 | 10 |
| Amphoteric: Lipomin LH | 23 | 18 |
| Detergent: Not added | 6 | 8 |

EXAMPLE 11

*Proteus mirabilis* ATCC 15290 was cultured in the same way as in Example 10, but in the absence of surface active agent, and bacterial cells obtained from 10 ml. culture broth were added to 10 ml. of the following solutions (I), (II), (III) and (IV), and the solutions were kept at 37° C. for 20 hours.

Solution (I):
  Indole _____ g./dl__ 3
  Sodium pyruvate _____ g./dl__ 3
  Ammonium acetate:
    pH: 8.0 (with $NH_4OH$) _____ g./dl__ 3

Solution (II):
  Indole _____ g./dl__ 3
  Sodium pyruvate _____ g./dl__ 3
  Ammonium acetate _____ g./dl__ 3
  Pyridoxal phosphate:
    pH: 8.0 (with $NH_4OH$) _____ mg./dl__ 10

Solution (III):
  Indole _____ g./dl__ 3
  Sodium pyruvate _____ g./dl__ 3
  Ammonium acetate _____ g./dl__ 3
  $Na_2SO_3$: pH: 8.0 (with $NH_4OH$) _____ g./dl__ 0.2

Solution (IV):
  Indole _____ g./dl__ 3
  Sodium pyruvate _____ g./dl__ 3
  Ammonium acetate _____ g./dl__ 3
  $Na_2SO_3$ _____ g./dl__ 0.2
  Pyridoxal phosphate:
    pH: 8.0 (with $NH_4OH$) _____ mg./dl__ 10

The amounts of L-tryptophan produced in the reaction solutions are as follows:

Reaction system:    Amount of L-tryptophan produced (g./l.)
Solution (I) _____ 36
Solution (II) _____ 45
Solution (III) _____ 40
Solution (IV) _____ 51

EXAMPLE 12

Bacterial cells obtained from 100 ml. culture broth of *Aerobacter aerogenes* ATCC 8724 were added to 100 ml. of the following solutions, and reacted at 37° C. for 20 hours.

| | Solution | | | |
|---|---|---|---|---|
| | (I) | (II) | (III) | (IV) |
| Indole (g./dl.) | 3.0 | 3.0 | 6.6 | 6.6 |
| Na pyruvate (g./dl.) | 4.0 | 4.0 | 7.1 | 7.1 |
| Ammonium acetate (g./dl.) | 4.0 | 4.0 | 7.0 | 7.0 |
| Inosine (g./dl.) | 0 | 4.0 | 0 | 11.0 |
| pH | 8.0 | 8.0 | 8.0 | 8.0 |

In the reaction mixtures containing inosine, L-tryptophan-inosine complex was precipitated. The precipitate and bacterial cells were collected by centrifugation, suspended in water, the pH of the suspension was adjusted to 1.0 with concentrated HCl, and solids were removed by centrifuging. The supernatant was introduced onto a column packed with a cation exchange resin of $NH_4$-form, and L-tryptophan adsorbed on the column was eluted with ammonia water. The eluate was concentrated under reduced pressure to form L-tryptophan crystals.

The amounts of L-tryptophan produced in the reaction solutions were as follows:

| Reaction system: | Amount of tryptophan produced (g./l.) |
|---|---|
| Solution (I) | 36 |
| Solution (II) | 56 |
| Solution (III) | 68 |
| Solution (IV) | 91 |

EXAMPLE 13

Bacterial cells obtained from 100 ml. culture broth of *Proteus mirabilis* ATCC 15290 were added to solutions containing 2 g./dl. 5-hydroxyindole, 2 g./dl. sodium pyruvate and 2 g./dl. ammonium acetate, of pH 8.0 in the absence or presence of 3 g./dl. inosine, and the solutions were kept at 37° C. for 20 hours.

The reaction mixtures were found to contain 5-hydroxy-L-tryptophan as follows:

| Inosine: | Amount of 5-hydroxy tryptophan produced (g./l.) |
|---|---|
| Absent | 12 |
| Present | 28 |

What we claim is:
1. A process for producing an amino acid of the formula

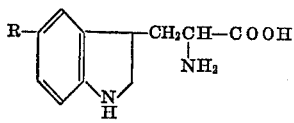

which comprises:
(a) holding a heterocyclic compound of the formula

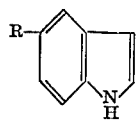

ammonium ions, and a source of at least one compound of the group consisting of pyruvic acid, fumaric acid, oxalacetic acid, malic acid, glyoxylic acid, and lactic acid in aqueous solution at pH 5 to 10 and at a temperature of 10° to 50° C. in the presence of an effective amount of tryptophanase until said amino acid is formed; and
(b) recovering the amino acid formed from said aqueous solution, in said formulas R being hydrogen, hydroxyl, methyl, or amino.

2. A process as set forth in claim 1, wherein said heterocyclic compound, said ammonium ions, and said source are present in said aqueous solution in respective amounts of 0.1 to 20 g./dl.

3. A process as set forth in claim 2, wherein said aqueous solution contains 0.01 to 1 g./dl. vitamin $B_6$.

4. A process as set forth in claim 2, wherein said aqueous solution contains a reducing agent selected from the group consisting of sulfurous acid, the sulfites and thiosulfates of sodium, potassium, and ammonium, cysteine, $\beta$-mercaptoethanol, and ascorbic acid.

5. A process as set forth in claim 2, wherein said aqueous solution contains an amount of inosine effective to increase the yield of said amino acid.

6. A process as set forth in claim 1, wherein said tryptophanase is produced prior to said reacting by culturing a tryptophanase producing microorganism in a culture medium containing tryptophan, 5 - hydroxytryptophan, 5-methyltryptophan or 5-aminotryptophan.

7. A process as set forth in claim 6, wherein said culture medium contains a surface active agent.

8. A process as set forth in claim 7, wherein said surface active agent is a non-ionic surface active agent.

9. A process as set forth in claim 6, wherein said microorganism is a species of Escherichia, Aerobacter, Citrobacter, Erwinia, Pseudomonas, Xanthomonas, Proteus, Salmonella, Paracolobactrum, Kluyvera or Clostridium.

References Cited

UNITED STATES PATENTS

| 3,293,141 | 12/1966 | Mateles et al. | 195—29 |
| 3,483,088 | 12/1969 | Seeley | 195—114 |

OTHER REFERENCES

Verkhoutseva et al.: Chem. Abs., vol. 67, #30041q, 1967.

Nakayama et al.: Chem. Abs., vol. 75, #87103f, 1971.

Morino et al.: Journal of Biological Chemistry, vol. 242, (1967), No. 12, pp. 2793–2799.

De Moss et al.: Journal of Biological Chemistry, pp. 167–171 (1969).

A. LOUIS MONACELL, Primary Examiner

T. G. WISEMAN, Assistant Examiner

U.S. Cl. X.R.

195—30, 47